(12) United States Patent
Richerzhagen et al.

(10) Patent No.: US 7,728,258 B2
(45) Date of Patent: Jun. 1, 2010

(54) LASER MACHINING OF A WORKPIECE

(75) Inventors: Bernold Richerzhagen, St-Sulpice (CH); Akos Spiegel, Chavannes (CH)

(73) Assignee: Synova SA, Ecublens (CH)

( * ) Notice: Subject to any disclaimer, the term of this patent is extended or adjusted under 35 U.S.C. 154(b) by 374 days.

(21) Appl. No.: 11/596,680

(22) PCT Filed: May 19, 2005

(86) PCT No.: PCT/CH2005/000284

§ 371 (c)(1),
(2), (4) Date: Mar. 30, 2007

(87) PCT Pub. No.: WO2005/110662

PCT Pub. Date: Nov. 24, 2005

(65) Prior Publication Data

US 2007/0193990 A1   Aug. 23, 2007

(30) Foreign Application Priority Data

May 19, 2004   (EP)   ................... 04405312

(51) Int. Cl.
*B23K 26/14*   (2006.01)
(52) U.S. Cl. ................................. 219/121.84
(58) Field of Classification Search ............ 219/121.67, 219/121.72, 121.84, 121.69, 121.85; 117/8
See application file for complete search history.

(56) References Cited

U.S. PATENT DOCUMENTS

| 3,991,296 A | 11/1976 | Kojima et al. |
| 4,766,009 A | 8/1988 | Imura et al. |
| 5,744,781 A | 4/1998 | Yeaton |
| 6,583,383 B2* | 6/2003 | Higashi et al. ......... 219/121.84 |
| 2001/0004480 A1 | 6/2001 | Mueller et al. |
| 2003/0062126 A1* | 4/2003 | Scaggs .................. 156/345.26 |
| 2003/0129814 A1 | 7/2003 | Mizukoshi |
| 2005/0045090 A1* | 3/2005 | Ikegami et al. .................. 117/8 |
| 2005/0103758 A1* | 5/2005 | Otis et al. .............. 219/121.67 |

FOREIGN PATENT DOCUMENTS

| DE | 41 38 468 A1 | 6/1993 |
| WO | WO-95/32834 A1 | 12/1995 |

\* cited by examiner

*Primary Examiner*—Geoffrey S Evans
(74) *Attorney, Agent, or Firm*—Birch, Stewart, Kolasch & Birch, LLP

(57) ABSTRACT

The invention relates to a device (1) for cutting wafers (2) into a number of chips with a laser beam (6) injected into a liquid jet (7). A thin flowing liquid layer (9) having a blasting effect is produced on the surface (5) of the wafer (2). This makes it possible to prevent projections resulting during laser cutting from depositing once again on the surface of the wafer. The result is a very high cleanness of the surface after the cutting process. The liquid layer (9) is produced, in particular, so that it is thinner in a machining area (10) around the machining point (8) than outside of the machining area (10). This ensures that the liquid layer is sufficiently thin (14) at the machining point (8) so that enough laser energy for removing material is applied to the wafer surface, and ensures that the liquid layer is sufficiently thick (15) outside of the machining area so that no area of the surface (5) of the wafer (2) dries out.

20 Claims, 1 Drawing Sheet

LASER MACHINING OF A WORKPIECE

BACKGROUND OF THE INVENTION

1. Field of the Invention

The invention relates to a method for machining a workpiece by means of laser radiation injected and guided in a liquid jet, in which the liquid jet having the laser radiation is directed on to a surface of the workpiece and the workpiece is machined at an operating point. The invention relates, further, to a device for machining a workpiece by means of laser radiation which can be directed on to a surface of the workpiece, the workpiece being capable of being machined at an operating point, and the laser radiation being injected and guided in a liquid jet.

2. Description of the Related Art

Laser radiation can be used, particularly in industry, in many different ways for machining the most diverse possible materials, such as, for example, metals, plastics or even ceramics. Machining ranges from cutting, drilling and welding through to material removal or marking.

Typically, in the machining of a workpiece by laser radiation, material is removed from the workpiece. In this case, small material particles occur, what are known as ejections, which settle or melt on the surface of the workpiece again. Depending on the nature of the workpiece and/or of the workpiece surface or of the ejections, it may happen that these bond firmly with one another again. These deposits on the surface of the workpiece may adversely influence the properties of the final product and are therefore usually undesirable. If at all possible, therefore, they have subsequently to be removed again at high outlay. Further, during machining by laser radiation, the workpiece is typically heated, and this may likewise entail undesirable consequences for the workpiece.

WO/9532834 discloses a device in which the laser radiation is injected into a liquid jet which acts as a light guide. As a result, not only can the energy of the laser radiation be brought to the operating point, but the liquid at the same time acts as a coolant which efficiently cools the workpiece in the machining region. Furthermore, vapors, particles and aerosols which occur during machining by laser radiation can be bound or prevented. However, the liquid quantity of the liquid jet into which the laser radiation is injected is not sufficient to flush away completely the ejections occurring during machining.

U.S. Pat. No. 3,991,296 A discloses a further device for machining and segmenting a wafer by means of a laser. In order to prevent machining residues from sticking to the wafer, a closed interspace, through which deionized water flows, is produced, just above the wafer, with the aid of a transparent glass plate. The laser beam directed on to the wafer penetrates through the glass plate and the water layer and then cuts the wafer, while the water is intended to cool the residues occurring in this case and thus to prevent the residues from sticking to the wafer. After cutting, these residues are then simply to be washed away, at most with the aid of low ultrasound.

The disadvantages of this device are that the water layer on the wafer disturbs the laser radiation in such a way (refraction, diffusion, damping) that the laser beam loses both sharpness and energy, so that the workpiece cannot or can no longer be machined efficiently. Moreover, in the method described, it is difficult or even impossible to discharge the melt occurring during machining out of the machining region, since the glass plate prevents the use of a cutting gas. Finally, in spite of the water layer, subsequent cleaning of the final product is necessary.

US 2003/129 814 A1 describes a further method for machining a semiconductor element by means of a laser beam. In order to avoid the diffusion of the laser light on the residues, the silicon substrate is tilted to one side and flushed over with water. As a result, the residues are flushed away around the operating point, and cooling of the substrate takes place at the same time.

In this method, too, the laser beam is diffused and damped by the water layer, thus making it difficult or even impossible to carry out the machining of the silicon substrate. Further, here too it is not possible to discharge the melt out of the machining region on the silicon substrate, since cutting gas which expels the melt cannot be used.

SUMMARY OF THE INVENTION

The object of the invention is to provide a method belonging to the technical field initially mentioned, which avoids said disadvantages of the known methods and, in particular, makes it possible to machine a workpiece efficiently by means of laser radiation and largely to prevent the ejections occurring during machining from being deposited on the workpiece surface.

In a method for machining a workpiece by means of laser radiation injected and guided in a liquid jet, in which the liquid jet having the laser radiation is directed on to the workpiece surface and the workpiece is machined at an operating point, according to the invention, a flowing liquid layer is generated on the surface of the workpiece by means of a liquid, for example, water, in such a way that the liquid layer has a thickness of less than 1 millimeter (mm), in particular of between 0.01 mm and 0.5 mm, in an operating region around the operating point.

Since the laser radiation is injected into a liquid jet which serves as a beam guide for the laser radiation, it becomes possible for the first time to penetrate, undisturbed, the thin liquid layer on the workpiece surface by means of the laser radiation. As is known from WO/9532834, the liquid jet has a high velocity. As a result, the air surrounding the liquid jet and located on the surface of the jet is entrained by the latter. When the liquid jet impinges on to the thin liquid layer on the surface of the workpiece, the jet, together with the entrained air, then displaces the liquid layer at the operating point and thereby guides the laser radiation on to the surface of the workpiece. As a result, the laser radiation remains sharp and is neither refracted nor diffused or damped by the thin liquid layer, and the workpiece can be machined efficiently. If the thickness of this liquid layer overshoots the specified value of at most 1 mm, it is difficult, in spite of the liquid jet, for the liquid layer to be penetrated, undisturbed, by the laser radiation. Efficient and accurate machining of the workpiece is then no longer possible. The liquid layer on the workpiece surface has the effect, all around the operating point, that the ejections occurring during the machining of the workpiece by laser radiation, cool and cannot settle on the workpiece surface. The liquid layer flushes the cooled ejections away immediately. Further, the liquid jet expels the melt occurring during machining out of the machining region efficiently, with the result that the use of a cutting gas becomes unnecessary. At the same time, even better cooling of the workpiece at the operating point and, in particular, of the cut edges, can thereby be achieved. With a suitable formation of the liquid jet, long compact laser beam lengths of up to 100 millimeters can be achieved in this way. This technique allows even narrow deep cuts and drillings with virtually perpendicular side walls, without tracking the focal point of the laser radiation. Vapors and odors can also be bound more effectively.

In the case of a slowly flowing or even stationary liquid layer on the workpiece surface, there would be no assurance that the ejections would be sufficiently cooled and flushed away completely. Moreover, the thickness of the liquid layer would be only difficult to control in the desired range below 1 mm. The liquid layer on the workpiece surface is therefore preferably generated in such a way that it has a shooting flow in the operating region. It thereby becomes possible to achieve a stable thin liquid layer with a thickness of less than 1 mm. Moreover, the thickness of the liquid layer can be controlled more effectively and, due to the high and stable flow velocity, the ejections can be efficiently cooled and flushed away, thus resulting in a clean workpiece surface and making subsequent cleaning unnecessary.

The term "shooting" is well-defined in hydrodynamics for liquids. It relates to the Froude number FR which, in the case of a flowing (flat) liquid is defined as the ratio of the flow velocity v of the liquid to the propagation velocity (wave velocity) c of gravity waves, that is to say surface waves on the liquid surface: $FR=v/c$. The wave velocity c can itself be expressed as the root of the product of gravitational acceleration g and liquid height h: $c=\sqrt{g*h}$. The Froude number thus becomes $FR=v/\sqrt{g*h}$. That is to say, liquid moves in a shooting manner when the Froude number is higher than 1. When the Froude number is between 0 and 1, the liquid flows in a flowing manner. In standing water, therefore, the Froude number is equal to 0.

However, the following conditions must be adhered to in the generation of the liquid layer. On the one hand, the thickness of the liquid layer at the operating point should not be too great, as already mentioned, since otherwise, to be precise, the liquid jet in which the laser radiation is injected is disturbed on its way through the liquid layer and the laser radiation is decoupled from the liquid jet and therefore is diffused to too great an extent. On the other hand, the thickness of the liquid layer should also not be too small, so that no region of the workpiece surface dries out and therefore no molten material particles or particles with a molten sheathing break through the liquid layer.

Depending on the actual application, it may be that the above requirements regarding the liquid layer are mutually exclusive. To be precise, in the case of a liquid layer having essentially the same overall thickness, it may be that the maximum permitted thickness of the liquid layer, so that the laser radiation still passes through is smaller than the minimum necessary thickness so that the workpiece surface does not dry out in places. To be precise, if a liquid layer sufficiently thick to ensure that no deposits can occur is generated, the laser radiation no longer passes through the liquid layer. If, however, it is selected so as to be sufficiently thin so as to ensure that the laser radiation passes through with sufficient power, there is no longer any assurance that affected surface regions of the workpiece are always flushed over with the liquid.

The liquid layer is therefore advantageously generated in such a way that its thickness is not equal overall. In a preferred embodiment of the invention, the liquid layer is generated in such a way that its thickness in a region around the operating point, designated below as the operating region, is smaller than its thickness outside the operating region. The thickness of the liquid layer in the operating region is designated below as the first thickness and, as mentioned further above, is less than 1 mm. The thickness of the liquid layer outside the operating region is designated as the second thickness and is preferably above 1 mm, in particular between 1 mm and 5 mm.

Since, then, a liquid layer is generated on the surface of the workpiece which is thinner in the region of the machining point than outside the operating region, both requirements can be satisfied simultaneously in an elegant way. In the operating region and, in particular, at the operating point, the thickness of the liquid layer is selected such that a sufficient laser power can be applied to the workpiece surface. The thickness of the liquid layer outside the operating region is selected such that no region of the workpiece surface dries out and such that no material particles in the liquid, partially liquid or solid state can penetrate through the liquid layer. At the same time, it is also ensured that a liquid layer which cools the workpiece is always located on the surface of the workpiece in the region in which the latter is machined. Any vapors and odors which occur during the machining of the workpiece can likewise be bound effectively. The optical mapping conditions are not or are only insignificantly influenced or impaired due to the small thickness of the liquid layer in the operating region.

The most diverse possible liquids, such as, for example, oils, in particular oils from the silicone group, or liquids such as are employed in liquid fibers, may be used in order to generate the liquid layer. Typically, the same liquid is used for generating the liquid layer as for the liquid jet into which the laser radiation is injected. Advantageously, water is used, which is available virtually everywhere, is easy to obtain and, in contrast to oils, is generally considered to be environmentally neutral.

The water which is used for generating the liquid layer may also be purified and/or deionized as a function of the material or of the type of machining. This also makes it possible, to prevent the workpiece from being contaminated by the water or any ingredients in the water, such as, for example, dissolved salts. It is also possible to make the water (for example, also the purified and/or deionized water) electrically conductive in that, for example, carbon dioxide ($CO_2$) is introduced. This is advantageous particularly when the ejections are electrically charged and/or when electrostatic voltages which are to be dissipated occur during the machining of the material.

The use of an electrically conductive liquid, such as, for example, electrically conductive water, has a further advantage. Components which are sensitive to electrostatic voltages, for example, microelectronic chips which are cut out from a wafer, can, to be precise, be protected against electrostatic charges by the use of an electrically conductive liquid, since such charges are dissipated by the liquid layer.

The method according to the invention is employed preferably for the machining of wafers. It is employed particularly preferably for cutting out the individual chips from silicon wafers on which typically a multiplicity of individual chips are produced. As compared with the division of the wafers by means of a saw, the thermal and mechanical stress on the wafers during machining by a laser guided in a water jet can be markedly reduced. This gives rise to fewer rejects, and production can be more efficient.

However, the invention is also suitable for the machining of any other workpieces. The machining spectrum ranges from the cutting and drilling of materials through marking to the removal of material or surface treatment, such as, for example, roughening, structuring or the removal of thin layers of the workpiece surface. In addition to semiconductor materials, virtually all other materials such as, for example, metals (steel, steel alloys, nonferrous metals) but also plastics, ceramics or biological materials and fabrics, are also suitable for machining.

In order to avoid the workpiece drying out, it would basically be sufficient to ensure a sufficient thickness, that is to say a specific minimum thickness, of the liquid layer. In order, as effectively as possible, to prevent the work piece from drying out, in an advantageous design variant of the invention the second thickness of the liquid layer is regulated, in that, for example, the liquid quantity supplied and/or flowing out is varied. In order to influence the water quantity flowing out, for example, the workpiece holder or even the workpiece itself may have a special shape. The workpiece holder may, for example, be designed in such a way that its edge is raised, as compared with the workpiece, so that the liquid flowing out is dammed to the desired height (convex surface). By contrast, if the surface has a concave form, the liquid flows out more quickly and the liquid layer becomes thinner.

However, the thickness of the liquid layer is preferably also influenced in that the liquid has substances which influence its surface tension added to it, that is to say increase or lower it, depending on the application. The thickness of the liquid layer increases with a rise in the surface tension. Depending on the liquid used, these may be various substances. If water is used, for example, surfactants may be added in order to lower the surface tension.

The generation of the liquid layer may take place basically in various ways. It could, for example, take place in that, first, a regularly thick layer is generated, the thickness of which is reduced in the region of the operating point, for example, by means of an air jet directed on to it. If the flow velocity and the pressure of the air jet are suitably selected, this displaces part of the liquid at the operating point and thereby provides the thinner liquid layer in the operating region. In this variant, however, the thin liquid layer thus generated may have irregularities, and this may lead to undesirably irregular machining of the workpiece. There would be just as little assurance that the liquid flows in a shooting manner in the operating region and, in particular, at the operating point. Moreover, the liquid jet and consequently the laser radiation injected into it may also be disturbed by such an air stream.

In a preferred variant, the liquid layer is generated by means of a first liquid supply device, for example a nozzle or a tube. The liquid layer is generated in such a way that the liquid is applied to the workpiece in the vicinity of the operating point. An applied liquid jet is referred to below in this context, and this term is to embrace individual liquid jets or a plurality of individual jets of any cross section. That is to say, this term is to be understood as meaning not only liquid jets of circular cross section. Liquid curtains, such as are generated, for example, by gush or fan nozzles, are also to be covered by this term.

When such a liquid jet impinges on to the workpiece surface, the liquid on the surface flows out in the radial direction, the flow velocity decreasing with an increasing distance from the impingement point. The layer has the highest flow velocity and the smallest layer thickness near the impingement point. If the flow velocity undershoots a critical velocity at an increasing distance from the impingement point, the thickness of the liquid layer increases.

In a further preferred embodiment of the invention, a second liquid supply device, for example, one nozzle or a plurality of nozzles, is used for generating the liquid layer. The second liquid supply device is designed in such a way that a sluggish regular liquid layer of the second thickness occurs on the surface of the workpiece, the term "sluggish" meaning in this context that this liquid layer, although flowing, has a low flow velocity. The two liquid supply devices may be used individually and in combination. If they are used individually, in most cases a uniformly thick liquid layer is generated.

Advantageously, however, the two liquid supply devices are used simultaneously. That is to say, by means of the second liquid supply device, a sluggish liquid layer of the second thickness is generated, and, at the same time, by means of the first liquid supply device, a liquid jet is applied to the workpiece in the vicinity of the operating point, as just described, in order to reduce the thickness of the liquid layer to the first thickness in the operating region. This liquid jet influences the flow behavior of the liquid layer in such a way that the latter flows more quickly in the operating region than outside this region. Again, as a result of this, the height of the liquid layer in the operating region is reduced, while outside the latter it remains essentially uninfluenced.

The properties of the liquid jet, in particular its impingement angle on the workpiece surface and its throughflow quantity, are selected then, such that the flow behavior of the liquid layer is influenced in such a way that the liquid moves in a shooting manner in the operating region around the operating point and in a flowing manner outside this region. Due to the impingement of the liquid jet on the liquid layer, in this region the flow equilibrium of the liquid layer is disturbed, and the liquid flows out on the workpiece surface in a shooting manner around the impingement point of the liquid jet. This shooting movement is maintained in a specific region around the impingement point and thereafter merges virtually at a jump into a flowing movement of the liquid. This more or less abrupt change from a shooting to a flowing movement, or vice versa, is designated as a hydraulic jump.

There are many parameters for influencing the properties of the liquid jet and consequently the size of the operating region and also the first thickness of the liquid layer in the operating region. Parameters suitable for this purpose are, in particular, its diameter, its impingement angle on the sluggish liquid layer or its throughflow quantity which is linked over the cross section to the velocity and inlet pressure of the liquid jet. In order to regulate the size of the operating region and the first thickness of the liquid layer in the operating region, basically all these parameters may be varied practically as desired.

Typically, however, the cross section of the liquid jet will be maintained, unchanged, during the machining of the workpiece, so that the transitions between flowing and shooting liquid and consequently the size of the operating region and also the first thickness of the liquid are preferably regulated by varying the impingement angle and the throughflow quantity of the liquid jet.

The cross section of the liquid jet may, of course, also be varied, in that, for example, in a machining intermission, a nozzle or a tube is exchanged for another nozzle or another tube with a smaller or larger cross section.

As already mentioned, the abovementioned parameters may, in principle, be varied almost as desired. The impingement angle of the liquid jet, that is to say the angle which is formed between the typically horizontal surface of the liquid layer and the liquid jet at the impingement point, may be selected, virtually as desired, for example, between 0 degree and 90 degrees. If a (sluggish) liquid layer is already present, it is even possible, in principle, not to apply the liquid jet to a liquid layer from above, but to feed it virtually below the surface. In these instances, however, it is difficult to achieve the desired shooting flow in the operating region.

The throughflow quantity of the water jet (defined as the liquid quantity per unit time) may also be selected, virtually as desired, between very small throughflow quantities, such as, for example, one milliliter per minute, and very high throughflow quantities, such as, for example, ten liters per minute. The cross section of the liquid jet may, in principle, also be selected from very small diameters, for example, 0.01 millimeter to very large diameters, for example up to 50 millimeters or even 100 millimeters.

In order to achieve the desired flow conditions with the shooting and the flowing movement of the liquid, however, in a preferred embodiment of the invention, the liquid jet is generated in such a way that, in the case of a throughflow quantity of 20 milliliters per minute to 500 milliliters per minute, it has a diameter of between 0.5 millimeters and 4 millimeters, at the same time being applied to the liquid layer from above at an impingement angle of between 45 degrees and 90 degrees.

In addition to the means for generating the laser radiation directed on to the surface of the workpiece and injected into and guided in the liquid jet, the device according to the invention comprises means for generating a flowing liquid layer on the surface of the workpiece, said means being designed in such a way that the liquid layer has a thickness of less than 1 millimeter, in particular of between 0.01 millimeters and 0.5 millimeters in an operating region around the operating point.

As already mentioned, these means for generating the liquid layer are preferably designed in such a way that the liquid layer generated thereby flows in a shooting manner in the operating region and the thickness of the liquid layer is below the maximum thickness of 1 mm.

These means for generating the liquid layer are designed, further, preferably in such a way that the first thickness of the generated liquid layer in the operating region around the operating point is smaller than the second thickness of the liquid layer outside this operating region. As already mentioned, the second thickness is above 1 mm, preferably between 1 mm and 5 mm.

In a further preferred embodiment of the device according to the invention, the latter comprises a second liquid supply device. This serves for generating a sluggish liquid layer of the second thickness on the surface of the workpiece. The liquid layer thus generated is either maintained, unchanged, as a liquid layer with an essentially equal overall thickness or, as already described above, the shooting region of the liquid layer is generated in that said liquid jet is applied to the liquid layer in the vicinity of the operating point.

The device may be designed for machining a multiplicity of materials and for carrying out a multiplicity of types of machining. However, a preferred field of use of devices of this kind is the machining of wafers and, in particular, the cutting of a multiplicity of chips out of a silicon wafer.

To generate the liquid layer, the device preferably comprises a first liquid supply device which is designed in such a way that the liquid can be applied to the workpiece in the vicinity of the operating point. This first liquid supply device may also be used, on the one hand, for generating a uniformly thick or thin liquid layer on the workpiece surface. On the other hand, together with the second liquid supply device, it may also be used, as described, for generating the liquid layer with different thicknesses in the operating region and outside of this.

This first liquid supply device is advantageously designed in such a way that a liquid jet can be generated, of which the impingement angle on to the workpiece surface and of which the throughflow quantity can be varied. As a result, the liquid jet can be varied, so that the liquid layer can be generated with a flow movement which is shooting in the operating region and is flowing outside the operating region.

Further advantageous embodiments and feature combinations of the invention may be gathered from the following detailed description and from the patent claims, taken as a whole.

BRIEF DESCRIPTION OF THE DRAWINGS

In the drawings used to explain the exemplary embodiment.

DETAILED DESCRIPTION OF THE INVENTION

Identical parts are basically given the same reference symbols in the figures.

Figure 1:
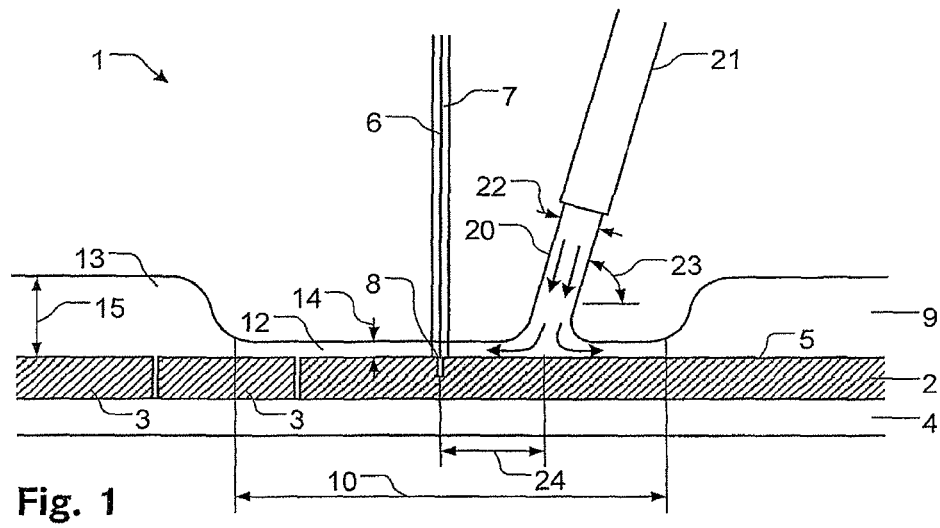
FIG. 1 shows a diagrammatic illustration of a device according to the invention.

FIG. 1 shows a diagrammatic illustration of part of a device 1 according to the invention for machining a workpiece, a wafer 2 in the present example. The wafer is a silicon disk on which a multiplicity of integrated circuits are produced in a known way. The machining of the wafer 2, then, involves cutting the circuits, also called chips 3, out of the wafer 2. Wafers of this kind are, as a rule, round and have a diameter of the order of a few dozen to a few hundred millimeters and a thickness in the range of a few dozen to a few hundred micrometers.

The wafer 2 is fastened on a carrier 4. The wafer 2 is held on the carrier 4, above and below the latter, for example by means of a pressure difference. For example, the ambient or atmospheric pressure prevails above the carrier 4. Below the carrier 4, a greater or lesser vacuum is generated. Since the carrier 4 itself is made air-permeable, for example porous, the wafer 2 is as it were sucked on to its surface and retained. In addition or instead, the wafer 2 may be glued to the carrier 4 with the aid of an adhesive film, in which case the film, if appropriate, is also made air-permeable.

A laser beam 6, for example, an Nd:YAG laser with a wavelength of 1.06 micrometers and a power of 100 watt, is used for cutting the wafer 2. Depending on the actual application, the laser power may, of course, also be varied from a few watts up to the kilowatt range. A different laser may likewise be used, depending on the type of application. The laser beam 6 is directed on to an operating point 8 on the surface 5 of the wafer 2, this leading in a known way to the removal of wafer material at the operating point 8 and, if desired, finally to the complete severance of the wafer 2. To cut the wafer 2, the laser beam 6 and the wafer 2 are moved in relation to one another, and this may take place by fixing the wafer 2 and displacing the laser beam 6, by fixing the laser beam 6 and displacing the wafer 2 or by displacing both the laser beam 6 and the wafer 2.

In the example illustrated in FIG. 1, the laser beam 6 is injected in a known way into a liquid jet 7 which acts as a light guide for the laser beam 6. The liquid jet 7 is generated with a pressure in the range of a few bar up to a few thousand bar, preferably in the range of 50 bar to 1000 bar. The diameter of the liquid jet 7 is in the submillimeter range, typically between 5 micrometers and 500 micrometers, preferably between 20 micrometers and 100 micrometers.

Particularly when an Nd:YAG laser is used, the liquid jet 7 is preferably generated with water, to which, if appropriate, other substances are admixed, in order to influence the jet properties. In addition to water, however, other electrically conductive or electrically nonconductive liquids may also be used. Oils, in particular silicone oils, are also suitable, for example, for generating the liquid jet 7.

The choice of liquid is also related to the laser used, since the absorption of the laser radiation may depend closely on the type of liquid. That is to say, care must be taken to ensure that the liquid used for the liquid jet 7 does not absorb or only slightly absorbs the laser radiation used.

According to the invention, then, a liquid layer 9 is generated on the surface 5 of the wafer 2 or of the chip 3 and is thinner in a region around the operating point 8, which is known as the operating region 10, than outside the operating region 10. The liquid layer 9 in the operating region 10 is designated below as the operating layer 12 of the thickness 14, and that region of the liquid layer 9 outside the operating region 10 is designated as the flushing layer 13 of the thickness 15.

The liquid layer 9 of different thickness is generated by means of a liquid jet 20 which is applied to the surface 5 of the wafer 2, for example, with the aid of a tube 21. The liquid jet 20 is applied to the wafer 2 in the vicinity of the operating point 10, and the selected distance 24 from the operating point 10 should be neither too great nor too small. However, the bandwidth for the actual choice of the distance 24 is relatively broad. That is to say, the distance 24 selected may be both very small and very large. Care must be taken merely to ensure that the operating point 8 lies within the operating region 10, that is to say within the region of the liquid layer having the thickness 14. The velocity of the relative movement of the laser beam 6 and of the wafer 2 may also influence the choice of the distance 24, so that the operating point 8 in any event lies within the operating region 10.

The flow of the applied liquid is indicated by the arrows. The impingement angle 23 and the throughflow quantity of the liquid jet 20 may be varied. They are selected such that the liquid moves in a shooting manner (Froude number higher than 1) in the operating layer 12 and in a flowing manner (Froude number lower than 1) in the flushing layer 13, the transition from the operating layer 12 to the flushing layer 13 taking place more or less at a jump.

In the case of a round wafer 2 with a diameter of 200 millimeters to 300 millimeters, the selected distance 24 is in the range of about 5 millimeters to 50 millimeters. The tube 21 is designed in such a way that the diameter 22 of the liquid jet 20 lies between 0.5 millimeters and 5 millimeters. With an impingement angle 23 of between 45 degrees and 90 degrees and with a throughflow quantity of the liquid jet 20 of between 20 milliliters per minute and 500 milliliters per minute, the thickness 14 of the operating layer 12 lies in the range of 0.01 millimeters to 0.5 millimeters and the thickness 14 of the flushing layer 13 lies in the range of 0.5 millimeters to 5 millimeters.

Figure 2:
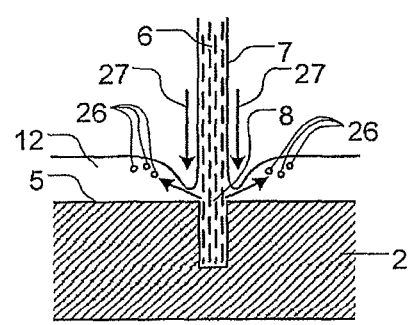
FIG. 2 shows a view of a detail of the device from FIG. 1.

FIG. 2 shows a view of a detail of the wafer 2 in the region of the operating point 8. The laser beam 6 injected in the liquid jet 7 fills the liquid jet 7 completely, this being indicated by the dashed lines. Care must be taken to ensure that the liquid jet 7 entrains the air on its surface. The air entrained by the liquid jet 7 is illustrated by the arrows 27. This entrained air, together with the liquid jet 7, when it impinges on to the operating layer 12, displaces part of the liquid of the operating layer 12 around the operating point 8, so that the liquid jet 7 having the laser beam 6 injected in it is virtually prolonged and guided practically on to the surface of the wafer 2. The liquid jet 7, as it were, projects into the operating region 12 and extends downward almost as far as the workpiece surface.

The laser beam 6 can thereby be guided for longer in the liquid jet 7, thus resulting in lower energy losses of the laser beam 6.

The laser beam 6 thus crosses the operating layer 12, impinges on to the surface of the wafer 2 and removes the material there, in that the latter melts due to the energy supplied by the laser beam 6. This gives rise to small particles 26, what are known as ejections, which may consist of molten wafer material and are immediately cooled and flushed away by the operating layer 12 having a shooting flow. This prevents the particles 26 from settling on the surface 5 of the wafer 2 and being bonded to the wafer 2 again there. These particles 26 are flushed away from the wafer by the operating layer 12 as far as the flushing layer 13 and then by the latter. The selected thickness 15 of the flushing layer 13 ensures that no region of the wafer surface dries out, but, instead, is covered at any time by a layer of liquid. The settling of the particles 26 even in the outer region of the wafer 2 can thereby be effectively prevented. The result is a completely clean surface 5 of the wafer 2. Subsequent cleaning is no longer necessary.

Figure 3:
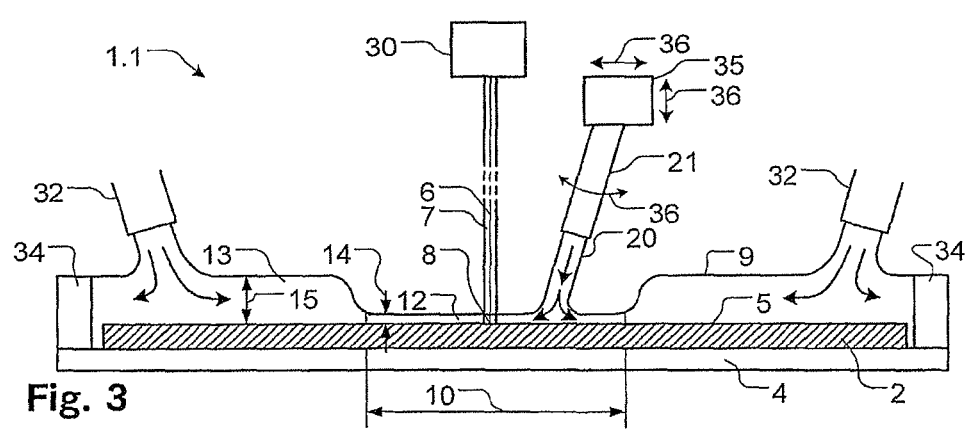
FIG. 3 shows a diagrammatic illustration of a further exemplary embodiment of the invention.

FIG. 3 shows a somewhat more comprehensive illustration of a further example of a device 1.1 according to the invention. The laser beam 6 injected in the liquid jet 7 is generated with the aid of a jet generation device 30 known in the prior art. This not only comprises the means (not illustrated) for generating the laser radiation and consequently the laser beam 6 in the desired wavelength range and with the required energy, but it also comprises the means (not illustrated) for generating the liquid jet 7 with the desired properties and the means (not illustrated) for injecting the laser beam 6 into the liquid jet 7.

In this example, to generate the liquid layer 9 on the surface 5 of the wafer 2, in addition to the liquid supply device 35 having the tube 21, a further liquid supply device is provided, which comprises one or a plurality of water outlets, such as, for example, pipes, hoses or special nozzles, two nozzles 32 being illustrated in FIG. 3. The nozzles 32 generate the flushing layer 13. The thickness 15 of the latter is controlled by the height of the edging 34 which may be designed as part of the carrier 4 or as a separate part of the device 1.1. The edging 34 is designed, for example in such a way that excess liquid runs out through special outflows or over the edge of the edging 34. In order to generate the operating layer 12 of smaller thickness 14, the device 1.1 also comprises a liquid supply device 35 by means of which a liquid jet 20 is generated and can be applied to the wafer surface by means of the tube 21. When the liquid jet 20 impinges on to the flushing layer 13, this influences the flow conditions in the liquid layer 9 in such a way that, once again, a thin operating layer 12 with a shooting movement of the liquid is formed around the impingement point of the liquid jet 20. Here, too, this region defines what is known as the operating region. In order to influence the properties of the liquid jet 20, the liquid supply device 35 is designed, for example, in such a way that both the throughflow quantity of the liquid jet 20 and the horizontal and vertical position and also the impingement angle 23 of the liquid jet 20 can be varied. This is indicated by the arrows 36. The liquid supply device 35 is preferably coupled in terms of movement to the jet generation device 30, so that the impingement point of the liquid jet 20 remains essentially constant in relation to the operating point 8.

It is perfectly possible for various liquids to be applied to the wafer 2 by means of the nozzles 2 or the tube 21. Typically, however, the same liquid is used.

The liquid necessary for generating the liquid layer on the wafer surface may also be applied to the wafer in another way.

It would be possible, for example, to generate the liquid jet 20, which generates the operating region having a shooting flow, with the aid of a plurality of individual jets. A device could, for example, also be envisaged which generates an annular liquid jet arranged at a specific distance around the laser beam. Instead of the nozzles 32, for example, a multiplicity of nozzles could also be integrated into the edging 34 in order to generate the flushing layer 13.

In summary, it may be stated that the invention makes it possible to flush away the ejections, occurring during the machining of a workpiece by laser radiation by means of a sufficiently thick liquid layer and at the same time to ensure that the liquid layer is sufficiently thin in the region of the operating point to ensure that a laser radiation energy quantity sufficient for machining the workpiece can be applied to the workpiece.

What is claimed is:

1. A method for machining a workpiece by means of laser radiation injected and guided in a liquid jet, in which the liquid jet having the laser radiation is directed on to a surface of the workpiece and the workpiece is machined at an operating point, comprising:
   generating, in an operating region around the operating point, a first liquid layer having a shooting flow, having Froude number greater than 1, on the surface of the workpiece by means of a liquid, said first liquid layer having a first thickness of less than 1 millimeter; and
   generating, outside the operating region, a second liquid layer having a flow in a flowing manner, having Froude number smaller than 1, on the surface of the workpiece, said second liquid layer having a second thickness of more than 1 millimeter.

2. The method as claimed in claim 1, wherein the first liquid layer and the second liquid layers are generated on the surface by means of a single liquid.

3. The method as claimed in claim 2, wherein the first liquid layer and the second liquid layer are generated on the surface of the workpiece by means of water.

4. The method as claimed in claim 1, wherein the first thickness is between 0.01 millimeter and 0.5 millimeter.

5. The method as claimed in claim 1, wherein the second thickness is between 1 millimeter and 5 millimeters.

6. The method as claimed in claim 1, wherein a wafer is machined, in particular a silicon wafer is cut into a multiplicity of chips.

7. The method as claimed in claim 1, wherein the second thickness of the second liquid layer is regulated, in that substances influencing the surface tension are added to the liquid and/or in that a liquid quantity supplied and/or flowing out is varied.

8. The method as claimed in claim 7, wherein the second liquid layer is generated by means of a second liquid supply device, wherein the liquid applied by the first liquid supply device in the operating region reduces the thickness of the liquid layer in the operating region to generate the first liquid layer having said first thickness.

9. The method as claimed in claim 8, wherein the first thickness of the first liquid layer and/or a size of the operating region are/is regulated, in that an impingement angle and/or a throughflow quantity of the jet are/is varied.

10. The method as claimed in claim 9, wherein the throughflow quantity is varied between 20 milliliters per minute and 500 milliliters per minute.

11. The method as claimed in claim 7, wherein the first liquid supply device applies the liquid to the workpiece in the form of a jet.

12. The method as claimed in claim 11, wherein the jet is generated with a diameter of between 0.5 millimeters and 4 millimeters, the impingement angle of the jet being varied between 45 degrees and 90 degrees and its throughflow quantity being varied between 1 milliliter per minute and 10 liters per minute.

13. The method as claimed in claim 1, wherein the first liquid layer is generated in that the liquid is applied to the workpiece in the operating region by means of a first liquid supply device.

14. A device for machining a workpiece by means of laser radiation which can be directed on to a surface of the workpiece, the workpiece being capable of being machined at an operating point, and the laser radiation being injected and guided in a liquid jet, comprising:
   a liquid supply device that provides,
      in an operating region around the operating point, a first liquid layer having a shooting flow, having Froude number greater than 1, on the surface of the workpiece by means of a liquid, said first liquid layer having a first thickness of less than 1 millimeter, and
      outside the operating region, a second liquid layer having a flow in a flowing manner, having Froude number smaller than 1, on the surface of the workpiece, said second liquid layer having a second thickness of above 1 millimeter.

15. The device as claimed in claim 14, wherein the device comprises a second liquid supply device for generating said second liquid layer of the second thickness.

16. The device as claimed in claim 14, wherein the device is designed for machining a wafer.

17. The device as claimed in claim 16, wherein the device is configured for cutting a silicon wafer into a plurality of chips.

18. The device as claimed in claim 14, wherein the device comprises, for generating the first liquid by means of a liquid, a first liquid supply device which is configured such that the liquid can be applied to the workpiece in the vicinity of the operating point.

19. The device as claimed in claim 14, wherein the first liquid supply device is configured in such a way that a jet of the liquid can be generated, an impingement angle and a throughflow quantity of the jet being variable.

20. The device as claimed in claim 14, wherein the first thickness is between 0.01 millimeter and 0.5 millimeter, and the second thickness is between 1 millimeter and 5 millimeters.

* * * * *